No. 776,935. PATENTED DEC. 6, 1904.
J. V. PUGH.
FASTENING FOR WHEELS AND CRANKS.
APPLICATION FILED MAY 9, 1904.
NO MODEL. 2 SHEETS—SHEET 2.
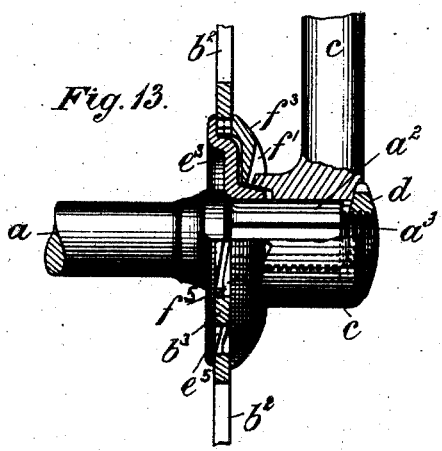
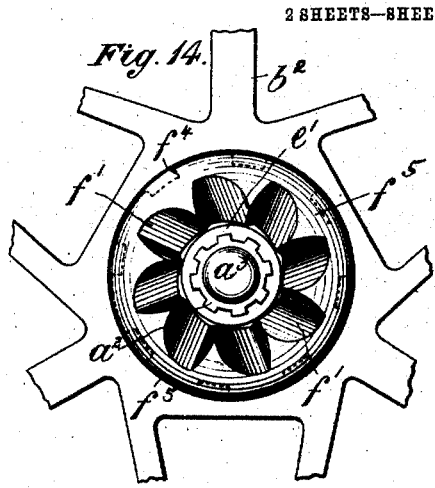
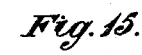
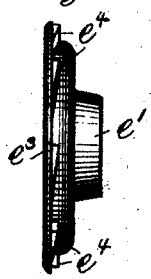
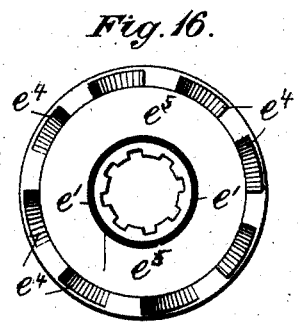
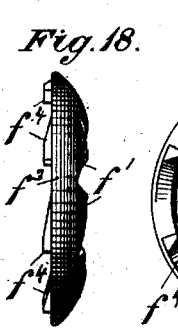
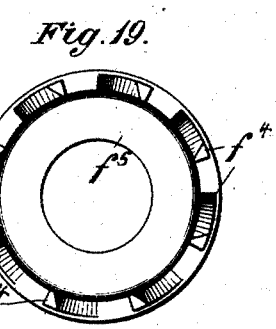
Witnesses:—
Richard Merrett
Arthur J. Powell
Inventor:—
John Vernon Pugh No. 776,935. Patented December 6, 1904.

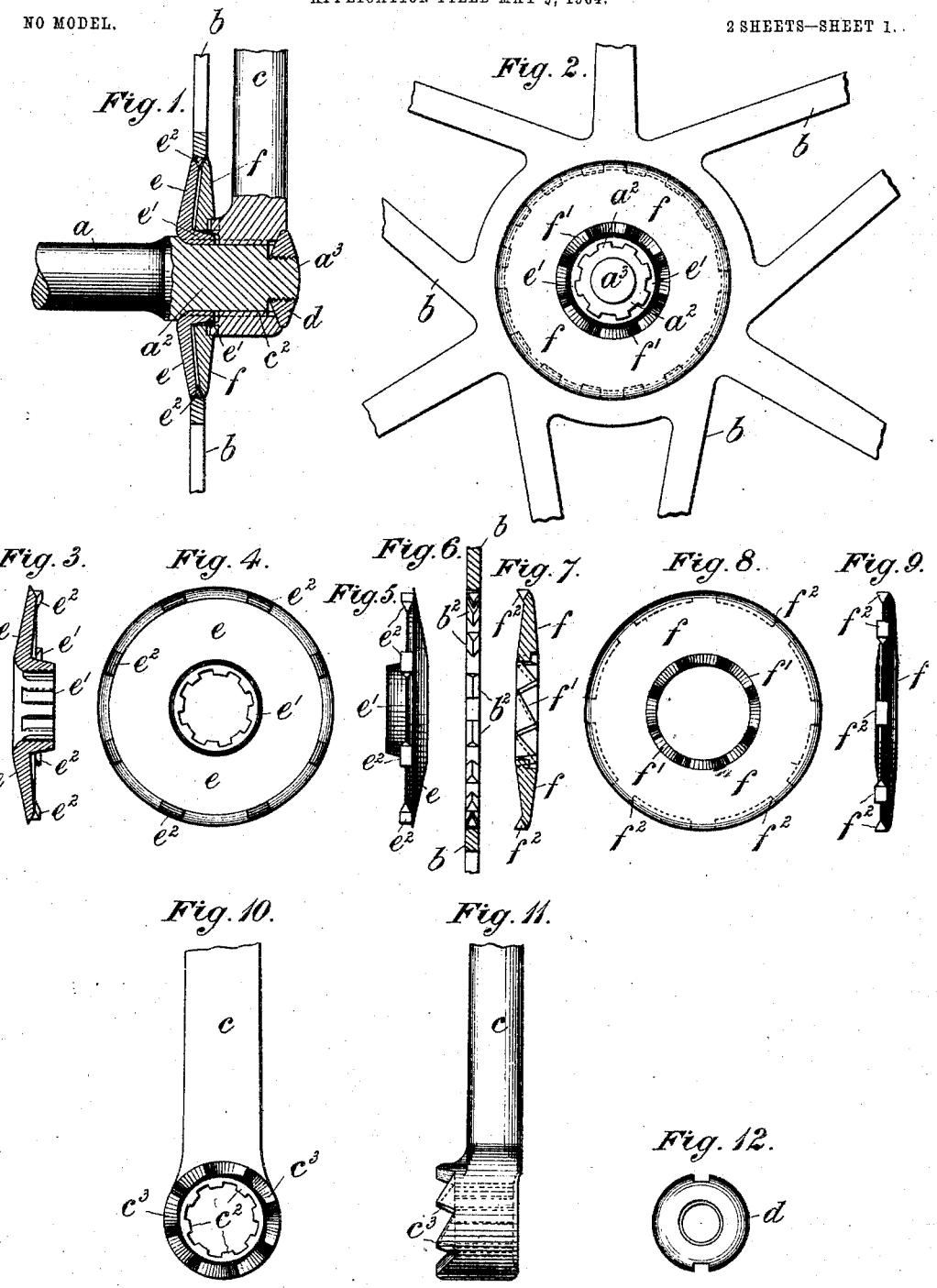

UNITED STATES PATENT OFFICE.

JOHN VERNON PUGH, OF ALLESLEY, NEAR COVENTRY, ENGLAND.

FASTENING FOR WHEELS AND CRANKS.

SPECIFICATION forming part of Letters Patent No. 776,935, dated December 6, 1904.

Application filed May 9, 1904. Serial No. 207,124. (No model.)

*To all whom it may concern:*

Be it known that I, JOHN VERNON PUGH, a subject of the King of Great Britain, residing at Guiting House, Allesley, near Coventry, England, have invented certain new and useful Improvements in Fastenings for Wheels and Cranks, of which the following is a specification.

This invention relates to certain new and useful improvements in fastenings for wheels and cranks, and aims particularly to improve the structure described and claimed in Patent No. 738,065, dated September 1, 1903.

In order that the present invention may be the better understood, I remark that the patented invention referred to consists of a member having grooves, a second member provided with ribs or keys extending into said grooves and provided on its outer face with ratchet-teeth, a third member provided with internal ribs or keys also extending into said grooves and provided on its inner face with ratchet-teeth engaging those of the said second member and means for holding the sets of ratchet-teeth in engagement.

By the present invention one of the internally-ribbed members is formed virtually into a carrier of other parts of mechanism, one of which other parts may have on it the face ratchet-teeth for the corresponding teeth on the inner face of the other internally-ribbed member to engage with. In other words, one (or both) of the internally-ribbed members may be compound—that is, made up of several parts which when the fastening is complete become so locked together and to the shaft or axle as to be practically one therewith.

Figure 1 of the accompanying drawings represents, in vertical section, a crank and chain-wheel fastening for a velocipede to which my invention is applied. Fig. 2 is an end elevation of the same before the crank and fixing-screw nut have been passed on to the crank-axle. Figs. 3 to 12, both inclusive, represent parts of the said crank and chain-wheel fastening detached, as is hereinafter explained. Fig. 13 represents, partly in side elevation and partly in vertical section, a modification of my invention as applied to a crank and chain-wheel fastening; and Fig. 14 is an end elevation of the same before the attachment of the crank and end screw-nut to the crank-axle. Figs. 15 to 19, both inclusive, represent parts of the crank and chain-wheel fastening, Figs. 13 and 14, detached.

Referring to the arrangement Figs. 1 to 12, both inclusive, $a$ is the velocipede crank-axle, (a portion only of which is represented,) having in its end $a^2$ the series of grooves or flutes, as in the patented fastening hereinbefore referred to and as seen in the end elevation, Fig. 2. Onto the grooved or fluted end $a^2$ of the crank-axle $a$ the plate $e$ of the pair of plates $e f$ is passed, the boss or flange $e'$ of which plate $e$ has a series of internally-projecting ribs or keys which engage freely (easily) with the notches or flutes in the end $a^2$ of the axle $a$. The plate $e$, detached, is represented in vertical section elevation of the outer face and edge view in Figs. 3, 4, and 5, respectively. As will be seen from these figures, the periphery of the plate $e$ is angular and carries a series of equidistant projections $e^2$ of a triangular figure in cross-section. The second or outer plate $f$ of the pair of plates $e f$, which is shown detached in Figs. 7, 8, and 9, differs from the plate $e$ in the respect that it is without a boss or flange, the plain hole in the said plate $f$ being of a size proper to pass over the boss or flange $e'$ of the plate $e$. Further, there is formed in the face of the outer plate $f$ a series of face ratchet-teeth $f'$. (See the sectional view and elevation of outer face, Figs. 7 and 8, respectively.) The triangular projections $f^2$ of the plate $f$, when the latter is applied to the plate $e$, alternate with or occupy positions midway between the projections $e^2$ of the plate $e$.

Before the plate $f$ is applied to the plate $e$ the chain-wheel $b$ (the inner or boss portion only of which is shown) is applied to the plate $e$. The boss or inner part of the chain-wheel $b$, detached, is represented in vertical section in Fig. 6. The inner edge of the chain-wheel $b$ is V-shaped in section, and the sides of the V-shaped edge have such an angle that when the angular edges or peripheries of the plates $e f$ are made to bear thereon they tightly fit the same and rigidly support the chain-wheel $b$. The V-shaped inner edge of the wheel $b$ has in it a series of equidistant radial notches, into which the triangular projections $e^2 f^2$ of the plates $e f$ fit. The making of the equidistant radial notches in the chain-wheel results in the formation of a series of inwardly-projecting parts $b^2 b^2$, which are gripped endwise by the projections $e^2 f^2$ of the plates $e f$, respectively, when the parts are screwed tightly together. After the chain-wheel $b$ and plate $f$ have been applied to the plate $e$ the crank $c$ (shown detached in side and end elevation in Figs. 10 and 11, respectively) is fitted on the crank-axle. The boss of the crank $c$ has internally-projecting ribs or keys $c^2$, (see Fig. 10,) which freely engage with the grooves or flutes in the end $a^2$ of the crank-axle and also face ratchet-teeth $c^3$ on its inner side, the more inclined sides of which teeth bear on the more inclined sides of the face ratchet-teeth $f'$ of the plate $f$. When the screw-nut $d$, Fig. 12, is screwed onto the screwed terminal $a^3$ of the crank-axle $a$, the crank $c$ is forced against the outer plate $f$, and the action of the bearing-faces of the ratchet-teeth of the two parts on one another tends to turn the compound part $e b f$ and crank $c$ in opposite directions on the crank-axle $a$. Consequently the internally-projecting ribs or keys of the plate $e$ and crank $c$ are made to bind on opposite sides of the grooves in the end $a^2$ of the crank-axle with such force as to insure a firm connection of the parts thereon.

The modification of the crank and chain-wheel fastening represented in Figs. 13 to 19, both inclusive, have for their object to show that the details of construction may be varied within considerable limits without affecting or altering the essential feature of the invention. Referring to the arrangement, Figs. 13 to 19, it will be seen that the chain-wheel $b^2$ may be gripped between and supported by the two plates $e^3 f^3$ by making on the presented faces of the two plates ratchet-teeth $e^4 f^4$, respectively. (See the views of the plate $e^3$, detached in Figs. 15 and 16, and the views of the plate $f^3$, detached in Figs. 18 and 19.) The inner edge of the chain-wheel $b^2$ in this arrangement is not V-shaped, the radial projections formed by the notching of the inner edge of the wheel being plain, as will be seen by reference to the sectional view of the detached chain-wheel in Fig. 17. When the parts are put together, the plain projections of the chain-wheel $b^2$ are gripped between the ratchet-teeth of the two plates $e^3 f^3$, as will be seen by reference to the lower half of Fig. 13, where one of the projections of the wheel $b^2$ is represented in section and marked $b^3$, and the two ratchet-teeth by which the projection $b^3$ is gripped are marked $e^5 f^5$, respectively.

I wish it to be understood that the invention hereinbefore described may be employed with facility in many other connections than those herein specified.

Having now described my invention, what I claim as new, and desire to secure by Letters Patent, is—

The combination with a member having grooves, of a second and compound member consisting of a pair of disk or washer-like plates one of which plates has internally-projecting ribs or keys extending into the grooves of the first member the other disk or washer-like plate being internally plain but having face ratchet-teeth on its outer side, a third member engaged and carried by the two disks of the second member, a fourth member with internal ribs also extending into the grooves of the first member and having ratchet-teeth engaging those of the outer plate of the second member and means for holding the sets of ratchet-teeth in engagement.

In testimony whereof I have hereunto set my hand in presence of two subscribing witnesses.

JOHN VERNON PUGH.

Witnesses:
RICHARD SKERRETT,
ARTHUR J. POWELL.